Nov. 11, 1947.    R. W. JOHNSON ET AL    2,430,719
CONSTANT LEVEL DEVICE
Filed Sept. 6, 1943

INVENTORS.
ROY W. JOHNSON
LOURDES V. McCARTY.
BY VERNON R. PAWELSKY.
John W. Michael
ATTORNEY.

Patented Nov. 11, 1947

2,430,719

UNITED STATES PATENT OFFICE 2,430,719

CONSTANT LEVEL DEVICE

Roy W. Johnson, Lourdes V. McCarty, and Vernon R. Pawelsky, Milwaukee, Wis., assignors to Automatic Products Company, Milwaukee, Wis., a corporation of Wisconsin Application September 6, 1943, Serial No. 501,400

5 Claims. (Cl. 137—68)

This invention relates generally to a constant level device of the type employed between the tank or reservoir for the fuel and a burner of a gravity feed oil burner, and more particularly to a constant level device of this character which is capable of functioning efficiently even when subjected to constant vibration or tilting. The capacity of the device to function unimpaired even when subjected to constant vibration or tilting renders it especially advantageous when combined with oil burning heaters used on trailers, boats, and the like.

Constant level devices of this character generally include a casing having a liquid supply chamber provided with an inlet connected to the tank or reservoir. An inlet valve regulates the flow of the liquid fuel into the supply chamber and is controlled in its action by a liquid level control means usually in the form of a float buoyed up in the liquid in the supply chamber and fixed to one end of a lever, an intermediate portion of which is fulcrumed to pivot about a fixed axis and the other end of which is operatively interconnected with the inlet valve. One or more outlets lead from the supply chamber to the burner or burners. The flow through each outlet is controlled by a metering valve. To prevent flooding, should the metering valve stick or fail to function effectively, it has also been the practice, in applications of this character, to provide an overflow pipe, the upper end of which is positioned a suitable distance above the liquid level normally maintained in the liquid supply chamber so that when the liquid level rises to a predetermined extent above the normal level, the excess liquid will be drained from the liquid supply chamber to a suitable point of drainage and flooding prevented.

With prior constructions, the flow of liquid fuel through the metering valve varies as the constant level device is tipped or tilted since the height of the liquid over the metering orifice is not the same when the device is tipped as it is when the device is level, and further since the flow of the liquid through the metering orifice is proportional to the height of the liquid thereover. Then, again, with such prior constructions, wherein as pointed out, the float is fixed to its float lever, while the volume of the float submerged is the same when the constant level device is tilted as it is when it is level, the center of buoyancy shifts toward the fulcrum of the float lever when tilted in one direction and away from the same when tilted in the opposite direction, thereby causing the oil level to unduly rise or fall as the case may be. In either event, the predetermined proper level of the liquid fuel oil in the liquid supply chamber is not maintained. Finally, difficulty has also been encountered with the overflow devices utilized in these prior constructions, inasmuch as these overflow devices have customarily been so placed that when the constant level device rocks or tilts to any substantial degree, overflow occurs although none is necessary or desirable.

The present invention proposes to overcome these difficulties by employing a float in the form of an annulus or a so-called "doughnut" type of float; by symmetrically disposing the float with respect to its float lever and pivotally or rockably interconnecting the float with its lever; by locating the metering slot or orifice of the metering valve at the center line of the float; and by locating the upper open end of the overflow pipe close to the center line of the float.

With the float symmetrically interrelated with its float lever, and rockably or pivotally interconnected thereto, when the constant level device tips or tilts, the float merely rides with the liquid, and the buoyancy and the center of buoyance remain the same as when the control is level.

With the metering slot or orifice of the metering valve located at the center line of the float, the height of the liquid over the metering slot or orifice remains the same when the constant level device is tilted or tipped as it does when it is level, and consequently the flow through the metering orifice will remain the same under both conditions.

By having the upper open end of the overflow pipe close to the center line of the float, unnecessary or undesirable overflow when the constant level device is tipped or tilted will be avoided since the upper open end of the overflow pipe in such position will always remain above the desired level of the liquid.

A further object of the invention is to provide a constant level device having these advantages and capacities, and which is a simple, compact, and closely organized construction, reliable, safe, and effective in operation, and easy and comparatively inexpensive to manufacture.

Other objects and advantages reside in certain novel features of the construction, arrangement, and combination of parts, which will be hereinafter more fully described and particularly pointed out in the appended claims, reference being had to the accompanying drawing forming a part of this specification, and in which:

Figure 1:
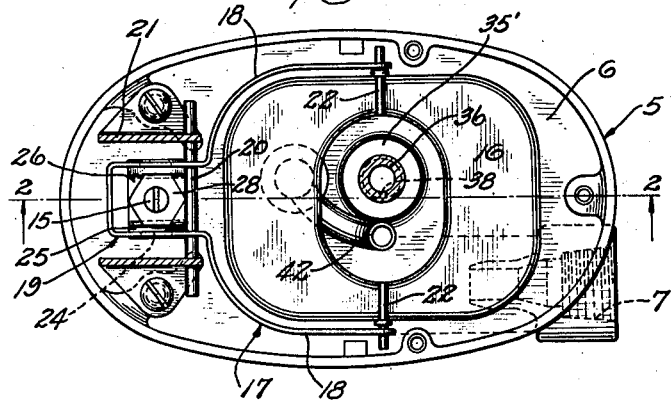
Figure 1 is a view partly in top plan and partly in horizontal cross section showing a constant level device embodying the present invention, the top of the device and the top of one of its supporting brackets being removed for the sake of illustration.
Figure 2:
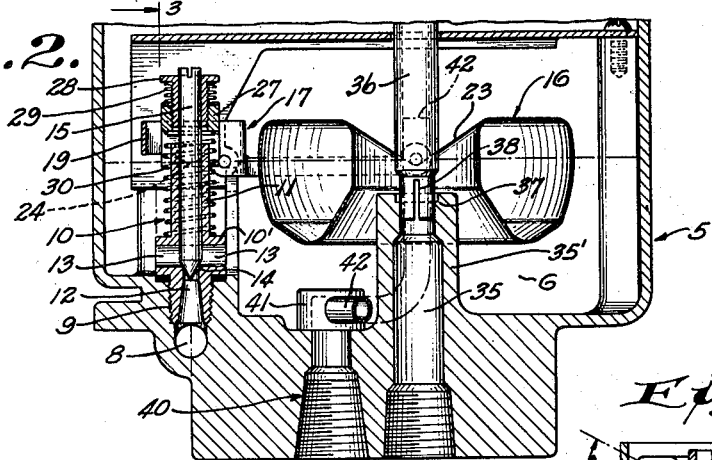
Figure 2 is a view in central, vertical, longitudinal cross section, taken on line 2—2 of Figure 1.
Figure 3:
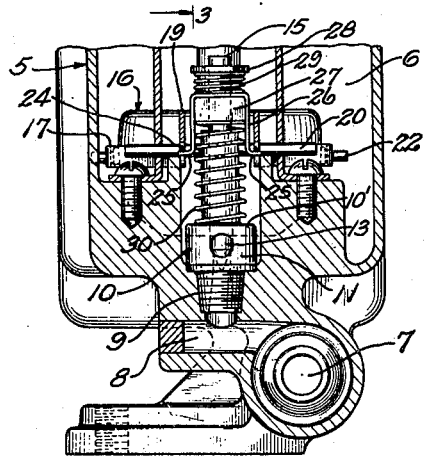
Figure 3 is a view in transverse, vertical cross section, taken on line 3—3 of Figure 2.

Referring to the drawing, it will be seen that a constant level device, embodying the present invention, comprises a casing 5 provided internally with a liquid supply chamber 6. A liquid fuel supply conduit or inlet 7 is provided on the underside of the casing. This conduit 7 is connected with a tank or reservoir for liquid fuel (not shown). At one point this fuel supply conduit 7 communicates with a transverse passage 8 (see Figure 3) which in turn communicates with an internally threaded opening 9 formed in the bottom of the liquid supply chamber and extending from the passage 8 to the liquid supply chamber 6. The communication which this opening 9 may afford between the passage 8 and the liquid supply chamber 6 is regulated by an inlet valve designated generally at 10. The inlet valve 10 comprises a casing 11 having its lower end threaded into the opening 9 and provided with an axial opening 12 and transverse openings 13 intersecting the axial opening 12 and communicating with the liquid supply chamber 6. Just below the intersection of the openings 12 and 13 a valve seat 14 is provided. The beveled lower end of a needle valve 15 coacts with the valve seat 14 to regulate the flow of liquid fuel from the conduit 7 into the liquid supply chamber 6. As shown, the needle valve 15 is slidably interfitted with the upper portion of the axial opening 12 which is adapted to have a guiding fit therewith. The operation of the valve 15 is controlled from a float 16 buoyed up by the liquid in the supply chamber 6 and operatively interconnected with the valve 15 through a float lever 17 in the special manner now to be described. The float 16 is in the form of an annulus or of the "doughnut" type shown in the drawing. The float lever 17 is of a bail-like construction shown to advantage in Figure 1. Its curved side arms 18, each of which parallels one-half of the float, are connected at one end by a U-shaped connecting member or bridge 19. Near the juncture of the U-shaped connecting member 19 and the arms 18 the side members of the U-shaped connecting member have transversely alined openings to receive the intermediate portions of a pivot or fulcrum pin 20, the ends of which are supported on the side members of a supporting bracket 21. The pin 20 provides a fixed fulcrum about which the float lever 17 fulcrums or pivots. The ends of the arms 18, opposite the U-shaped connecting member 19, are provided with transversely alined trunnions 22, the trunnions being fixed to their arms and projecting inwardly over the central portion of the float. The float 16 has its upper wall formed centrally with V-shaped depressions 23 in the bottoms of which the trunnions 22 engage. This is one advantageous way in which the float and its lever may be symmetrically interrelated and also rockably or pivotally interconnected.

While the float lever may be operatively interconnected with the needle valve 15 in various ways, one advantageous way of accomplishing this is illustrated in the drawing. As there shown the side members of the U-shaped connecting piece 19 of the float lever 17 are formed with integral downwardly extended, rounded bosses or lugs 24 which bear on outwardly directed shoulders 25 provided on an inverted U-shaped abutment 26 mounted on the needle valve. The abutment may be a sheet metal stamping, and its body portion is apertured to fit over the upper end of the needle valve and rest on a nut 27 which is threaded on a sleeve 28 press-fitted or otherwise secured to the upper end of the needle valve. A spring and washer 29 are employed between the flanged upper end of the sleeve 28 and the top of the nut 27 to releasably maintain the nut in any adjustment.

The inlet valve is biased to open position preferably by means of a coil spring 30 which surrounds the casing of the valve, abuts the shoulder 10' at its lower end, and abuts the under side of the nut 27 at its upper end.

An outlet passage 35 leads from the liquid supply chamber 6 and is connected by means of a suitable pipe (not shown) with the burner (also not shown). A metering valve 36 is cooperatively interrelated with the valve seat 37 formed at the upper end of the tubular structure 35' which defines the outlet passage 35. The metering valve 36 has a metering slot 38. The metering valve 36 is offset from the center line of the float so that its metering slot 38 will be at the center of the float.

The bottom of the casing is also provided with an overflow outlet 40. This overflow outlet is connected by a pipe to any suitable point of overflow. A fitting 41 is combined with the inner end of this overflow opening and connects to the lower end of an overflow pipe 42 which curves over to the tubular structure 35' and then extends up along this structure and through the opening of the float 16 to a point well above the liquid level but located approximately in vertical alinement with or very close to the center line of the float for the purpose described.

Figure 4:
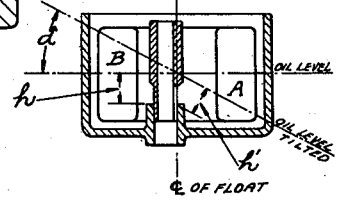
Figure 4 is a diagram illustrating the functioning of the metering valve when combined in the device in accordance with the present invention.
Figure 5:
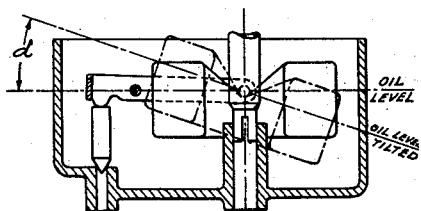
Figure 5 is a diagram illustrating the functioning of the float when symmetrically interrelated with and rotatably or pivotally interconnected to its float lever.

The action of the device will perhaps be better understood by reference to the diagram shown in Figures 4 and 5. Referring first to Figure 4, volume A is equal to volume B as the float is symmetrical about the vertical center line CL; therefore, the buoyancy of the float is the same in both positions. The direction of the thrust, due to the float buoyancy, is perpendicular to the surface of the fluid. Therefore, the force component effective on the inlet valve to counteract the weight of the float, float lever, etc., when the control is tipped is equal to the force component when level times the cosine of the angle $d$. But the weight of float, float lever, etc., acting against the float when the control is tipped in the direction shown on the sketch is their weight when the control is level times the cosine of the angle $d$. Therefore, the oil surface at the float center line will be the same distance from the bottom of the control when it is tilted as when it is level. The height that determines the oil flow when the control is tilted is $h'$, and is equal to $h$ times cosine of the angle $d$. The cosine of an angle of 30° is .866 and the flow is proportional to the $\sqrt{h}$ or for 30° tilt, to $\sqrt{.866}$ which is 93%. This is a drop in flow of only 7% for a tilt angle of 30°. The drop in flow for smaller tilt angles is less. If the metering stem was placed on the center line of the float, the metering orifice then would be half the diameter of the metering stem away from the center line of the float. An examination of Figure 4 will show that the flow would then change when the control is tilted as the height of oil above the metering orifice would change materially.

Referring now to Figure 5, if the float cannot pivot as in a conventional type oil control, and the control is tilted as indicated, volume submerged is the same as when the control is level, but the center of buoyancy will be shifted back towards the float arm pivot and the float will submerge more to get the increased buoyancy necessary to counteract the weight of the levers. This will cause the oil level to rise. The converse is true if the control is tilted in the reverse direction, and the oil level will drop.

When the float is pivoted and symmetrical about the pivot, the float will ride, as indicated by the dotted lines in Figure 5, and the buoyancy and the center of buoyancy remain the same as when the control is level.

The effect of the angle change is the same as for a tilt as shown in Figure 4 when the float lever pivot is on the same level as the float pivot.

While we have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

We claim:

1. A constant level device comprising a casing having a liquid supply chamber provided with an inlet, a valve for regulating flow through the inlet, a float buoyed up in the liquid in the supply chamber and having its top formed with central depressions, the float being symmetrical with respect to said central depressions, a bail-shaped float lever fulcrumed intermediate its ends and having curved arms paralleling approximately one-half of the float, trunnions fixed to and projecting inwardly from one end of each of said arms and bearing on the floor of the adjacent depression of the float, the end of the float lever opposite the trunnions being operatively interconnected with the valve.

2. A constant level device comprising a casing having a liquid supply chamber provided with an inlet, a valve for regulating flow through the inlet, a spring for biasing the valve to open position, a float lever fulcrumed intermediate its ends and having one end cooperable with the valve, trunnions on the opposite ends of the lever, a "doughnut" type float having central depressions in which said trunnions rest, said casing having an outlet alined with the opening of the float, a metering valve having a metering slot for regulating flow through the outlet, the outlet metering valve and its slot being disposed so the metering slot is in vertical alinement with the vertical center of the axis of interconnection of the float lever and float.

3. A constant level device comprising a casing having a liquid supply chamber provided with an inlet, a valve for regulating flow through the inlet, a spring for biasing the valve to open position, a bail-shaped float lever having one end of reduced U-shaped formation and having diverging curved arms projecting from said end, a fulcrum interengaged with the U-shaped formation of the float lever, said U-shaped formation of the float lever also coacting with the valve to control the opening and closing thereof, inwardly directed trunnions carried by the arms of the float lever, and a float provided with V-shaped depressions on its opposite sides with which the trunnions of the arms of the float lever are engageable.

4. In a device for maintaining a constant level in a body of liquid, a casing having a liquid supply chamber with an inlet thereto, a valve regulating the flow to the chamber through the inlet, a doughnut-type float buoyed up in the liquid in the chamber and having its top formed with depressions on an axis thereof, and a bail-shaped float lever fulcrumed intermediate its length and pivotally connected with the float, the ends of the lever having trunnions projecting therefrom and severally bearing in the depressions in the float.

5. In a device for maintaining a constant level in a body of liquid, a casing having a liquid supply chamber with an inlet, a valve regulating the flow through the inlet, a doughnut-type float buoyed up in the liquid in the supply chamber and having V-shaped depressions on opposite sides thereof and being symmetrical with respect to the depressions, and a float lever fulcrumed intermediate its length and having arms with trunnions projecting therefrom, one end of the lever being operatively connected with the valve, the lever trunnions being rockably held in the depressions by the buoyance of the float.

ROY W. JOHNSON.
LOURDES V. McCARTY.
VERNON R. PAWELSKY.

REFERENCES CITED

The following references are of record in the file of this patent:

UNITED STATES PATENTS

| Number | Name | Date |
|---|---|---|
| 2,068,138 | Johnson | Jan. 19, 1937 |
| 2,197,262 | Russel | Apr. 16, 1940 |
| 2,586 | Clinton | Apr. 29, 1842 |
| 913,354 | Breeze | Feb. 23, 1909 |
| 1,259,415 | Kuebler | Mar. 12, 1918 |
| 1,784,864 | Carter | Dec. 16, 1930 |

FOREIGN PATENTS

| Number | Country | Date |
|---|---|---|
| 525,394 | France | June 3, 1921 |
| 162,242 | Great Britain | Apr. 28, 1921 |